US000001485H

United States Statutory Invention Registration [19]

[11] Reg. Number: H1485

[43] Published: Sep. 5, 1995

Pottick et al.

[54] HIGH IMPACT RESISTANT BLENDS OF THERMOPLASTIC POLYAMIDES AND MODIFIED TRIBLOCK COPOLYMERS

[75] Inventors: Lorelle A. Pottick; Carl L. Willis, both of Houston, Tex.

[73] Assignee: Shell Oil Co., Houston, Tex.

[21] Appl. No.: 750,852

[22] Filed: Aug. 27, 1991

Related U.S. Application Data

[63] Continuation of Ser. No. 140,006, Dec. 31, 1987, abandoned.

[51] Int. Cl.[6] ..... C08L 51/02

[52] U.S. Cl. ..... 525/66

[58] Field of Search ..... 525/66

[56] References Cited

U.S. PATENT DOCUMENTS

| | | | |
|---|---|---|---|
| 2,071,250 | 2/1937 | Carothers | 260/106 |
| 2,071,251 | 2/1937 | Carothers | 18/54 |
| 2,241,322 | 5/1941 | Hanford | 260/2 |
| 2,312,966 | 3/1943 | Hanford | 260/78 |
| 3,113,986 | 12/1963 | Breslow et al. | 260/683.9 |
| 3,251,905 | 5/1966 | Zelinski | 260/879 |
| 3,264,272 | 8/1966 | Rees | 260/78.5 |
| 3,265,765 | 8/1966 | Holden et al. | 260/876 |
| 3,390,207 | 6/1968 | Moss et al. | 260/879 |
| 3,598,887 | 8/1971 | Darcy et al. | 260/879 |
| 3,639,521 | 2/1972 | Hseih | 260/880 |
| 4,041,103 | 8/1977 | Davison et al. | 260/857 |
| 4,174,358 | 11/1979 | Epstein | 525/183 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,242,470 | 12/1980 | Gergen et al. | 525/92 |
| 4,427,828 | 1/1984 | Hergenrother et al. | 525/66 |
| 4,429,076 | 1/1984 | Saito et al. | 525/57 |
| 4,578,429 | 3/1986 | Gergen et al. | 525/291 |
| 4,628,072 | 12/1986 | Shiraki et al. | 525/57 |
| 4,657,971 | 4/1987 | Shiraki et al. | 525/57 |
| 4,783,503 | 11/1988 | Gergen et al. | 525/66 |

FOREIGN PATENT DOCUMENTS

| | | |
|---|---|---|
| 189672 | 8/1986 | European Pat. Off. . |
| 219973 | 4/1987 | European Pat. Off. . |

*Primary Examiner*—Donald P. Walsh
*Assistant Examiner*—Chrisman D. Carroll

[57] ABSTRACT

A super-toughened multiphase thermoplastic composition is provided by incorporating at least one functionalized, selectively hydrogenated alkenyl arene/conjugated diene block copolymer to which has been grafted an effective amount of carboxyl functional groups primarily in the alkenyl arene blocks thereof with an $\alpha$-polyamide.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH IMPACT RESISTANT BLENDS OF THERMOPLASTIC POLYAMIDES AND MODIFIED TRIBLOCK COPOLYMERS

This is a continuation of application Ser. No. 07/140,006, filed Dec. 31, 1987, now abandoned.

CROSS-REFERENCE TO RELATED APPLICATIONS

This is related to U.S. patent application Ser. No. 766,215, filed Aug. 16, 1985, now U.S. Pat. No. 4,783,503.

FIELD OF THE INVENTION

The present invention relates to an impact resistant polymeric composition. More particularly, it relates to an impact resistant polymeric composition comprising a polyamide and a modified block copolymer. The copolymer is obtained by modifying a base block copolymer composed of a selectively hydrogenated conjugated diene polymer block and an alkenyl arene polymer block with a carboxyl containing functional group grafted primarily in the alkenyl arene block. These carboxyl groups may then be neutralized with a metal ion to vary the degree of impact modification on the polymeric composition.

BACKGROUND OF THE INVENTION

Thermoplastic polyamides, such as nylon 6 and nylon 6,6, are a class of materials which possess a good balance of properties comprising good elongation, high strength, high energy to break and stiffness which make them useful as structural materials. However, thermoplastic polyamides are quite sensitive to crack propagation. Consequently, a major deficiency of thermoplastic polyamides is their poor resistance to impact and their tendency to break in a brittle rather than ductile manner, especially when dry.

In general, improvements in the impact resistance of thermoplastic resins have been achieved by incorporating a low modulus rubber. Such a material facilitates the formation of triaxial stress distributions needed for optimum toughening. Moreover, good dispersion of the rubber phase as well as developing adhesion between the rubber and matrix contribute to efficient impact modification of these resins.

It is well known to those skilled in the art that hydrogenated block copolymers of styrene and butadiene possess many of the properties useful for impact modification of plastics. These low modulus rubber materials display a low glass transition temperature, a characteristic advantage for optimum toughening at lower temperatures. Furthermore, these block copolymers contain little unsaturation which facilitates their blending with high processing temperature plastics without degredation of the elastomer phase.

Block copolymers are unique impact modifiers compared to other rubbers in that they contain blocks which are microphase separated over the range of applications and processing conditions. These polymer segments may be tailored to become miscible with the resin to be modified. Good particle-matrix adhesion is obtained when different segments of the block copolymer reside in the matrix and in the rubber phase. This behavior is observed when hydrogenated block copolymer of styrene and butadiene are blended with resins such as polyolefins and polystyrene. Impact properties competitive with high impact polystyrene are obtained due to the compatibility of polystyrene with the polystyrene endblock of the block copolymer. Other polyolefins are toughened due to enhanced compatibility with the rubber segment.

Although the hydrogenated block copolymers do have many of the characteristics required for plastic impact modification, these materials are deficient as impact modifiers for many materials which are dissimilar in structure to styrene or hydrogenated butadiene. In particular, significant improvement in the impact resistance of polyamides with the addition of these hydrocarbon polymers has not been achieved. This result is due to poor interfacial interaction between the blend components and poor dispersion of the rubber particles. Poor interfacial adhesion affords areas of severe weakness in articles manufactured from such blends which when under impact result in facile mechanical failure.

The placement of functional groups onto the block copolymer may provide sites for interactions with such polar resins and, hence may extend the range of applicability of this elastomer. Such interactions, which include chemical reaction, hydrogen bonding and dipole interactions, are a route to achieving improved interfacial adhesion and particle dispersion, hence improved modification of polar thermoplastics.

Many attempts have been made to improve the impact properties of polyamides by adding low modulus modifiers which contain polar moieties as a result of polymerization or which have been modified to contain polar moieties by various grafting techniques. To this end, various compositions have been proposed utilizing such modifiers having carboxylic acid moieties and derivatives thereof, for example, Epstein in U.S. Pat. Nos. 4,174,358; Saito et al. in U.S. Pat. No. 4,429,076; Hergenrother et al. in U.S. Pat. No. 4,427,828; and Shiraki et al. in U.S. Pat. Nos. 4,628,072 and 4,657,971.

Epstein discloses a broad range of low modulus polyamide modifiers which have been prepared by free radical copolymerization of specific monomers with acid containing monomers. Alternatively, Epstein discloses the modification of polymers by grafting thereto specific carboxylic acid containing monomers. The grafting techniques allowed for therein are limited to thermal addition (ene reaction) and to nitrene insertion into C-H bonds or addition to C=C bonds (ethylenic unsaturation). Though Epstein does disclose a broad range of polyamide modifiers, Epstein does not disclose or suggest the utilization of hydrogenated copolymers of alkenyl arenes and conjugated dienes nor, more particularly, modified selectively hydrogenated copolymers of alkenyl arenes and conjugated dienes as polyamide modifiers.

Saito et al. disclose polyamide compositions which contain a modified unsaturated aromatic vinyl compound/conjugated diene block copolymer as a polyamide modifier. The unsaturated block copolymer has been modified by grafting a dicarboxylic acid group or derivative thereof (e.g. anhydride moieties) at a point of ethylenic unsaturation via thermal addition (ene reaction). However, such modifiers and compositions containing same are deficient in that the weatherability and resistance to thermal deterioration are poor; and, therefore, the polymers and compositions have been used only in the fields where such properties are not required. Furthermore, it is also noted that the ene reaction is a reversible reaction.

Hergenrother et al. and Shiraki et al. also describe a polyamide composition containing a block copolymer similar to that of Saito et al. However, in order to improve the weatherability and resistance to heat aging, both partially hydrogenate the block copolymer in their respective blends to an ethylenic unsaturation degree not exceeding 20 percent of the ethylenic unsaturation contained in the block copolymer prior to hydrogenation. Once the block copolymer is partially hydrogenated, the block copolymer is modified by grafting a molecular unit containing a carboxylic acid group and/or a group derived therefrom (e.g. anhydride moieties). Hergenrother et al. disclose grafting via thermal addition (ene reaction) utilizing the available residual unsaturation in the block copolymer. As such, Hergenrother et al. retained the deficiencies associated with the reversibility of the ene reaction. On the other hand, Shiraki et al. utilized free radical initiators to perform the grafting therein.

As is readily apparent in each of the foregoing prior art polyamide compositions utilizing alkenyl arene/conjugated diene block copolymers as polyamide modifiers, improved impact modification of the particular polyamide is achieved via specific interactions, between the modified diene block and the polyamide. Thus, to the extent that impact modification and strength mechanisms rely on the elastomeric properties of the diene block of the copolymer, these properties have been adversely affected by modifying the diene block in this manner.

On the otherhand, Gergen et al., in the copending U.S. patent application Ser. No. 766,215, now U.S. Pat. No. 4,783,503, describe a polyamide composition containing a block copolymer which is a thermally stable, modified, selectively hydrogenated, high 1,2 content alkenyl arene/conjugated diene block copolymer grafted with at least one functional group utilizing the metalation process. Therein, the functional groups are grafted primarily in the alkenyl arene block. In this composition, interactions between the polyamide and rubber are achieved via the alkenyl arene block.

Further research and experimentation on polyamide compositions containing the modified block copolymers of Gergen et al. in copending U.S. patent application Ser. No. 766,215, now U.S. Pat. No. 4,783,503, (K-4669) have yielded unexpected and significant impact property improvements. These new polyamide blend compositions contain block copolymers having the carboxyl functional groups present in either or both their acid and neutralized metal carboxylate salt forms. In particular, the improvement increases as the proportion of carboxyl functional groups in their acid form increases. Whether either or both of these forms in combination produce improvements may be dependent on the particular polyamide(s) selected. Furthermore, the impact properties are also improved by increasing the degree of carboxyl functionality. Additionally, depending on the particular polyamide, the particularly preferred ranges of the degree of functionality and degree of neutralization may be ascertained wherein the polyamide blend composition possesses super-tough characteristics, which are highly desirable and unexpected.

To those skilled in the art, the degree to which the grafting reaction and particle size reduction occur, thereby promoting interfacial adhesion, together with the dispersion of the rubber within the blend typically contribute to impact toughening of the blend. The results herein demonstrate that functionalizing the alkenyl arene segment promotes covalent bonding between the modified block copolymer and the polyamide. Furthermore, the block copolymer also becomes well dispersed in the polyamide phase. However, there exist examples of compositions of a modified block copolymer and polyamide which are uniquely not super-tough yet grafting and good particle dispersion are observed. Hence, the super-tough blend compositions herein are unexpected and surprising.

In the compositions disclosed herein, ionic crosslinking is present within the alkenyl arene block domains within the modifier present in the polyamide blend composition. The function of the ionic crosslinking within the modifier phase is not entirely understood as it pertains to the properties of the blend composition.

The neutralization effect herein is to be distinguished from ionic crosslinking as is disclosed in Rees, U.S. Pat. No. 3,264,272; Saito et al., U.S. Pat. No. 4,429,076; and Gergen et al., U.S. Pat. No. 4,578,429. Rees and Gergen et al. ('429) utilize ionic crosslinking solely to improve the properties of the pure hydrocarbon polymer as opposed to improving the properties of polyamide blend compositions.

Rees is limited to ionic crosslinking in homopolymer systems in which the carboxyl groups are distributed throughout the homopolymer molecule. As such, Rees does not deal with copolymers and resulting alkenyl arene domain formation. On the otherhand, though Gergen et al. ('429) addresses block copolymers, the carboxyl groups are distributed throughout the elastomeric diene block rather than the alkenyl arene blocks. As a result, the elastomeric properties of the diene block may be adversely affected; and the arene block domain phenomena is not advantageously utilized.

Saito et al. utilize ionic crosslinking to improve the properties of modified block copolymer which are to be blended with a thermoplastic polymer having a polar group thereby improving the impact resistance and hardness of the blend. In Saito et al., the block copolymer is modified by grafting maleic anhydride onto the conjugated diene portion thereof. As in Rees and Gergen et al. ('429), the elastomeric properties of the diene block may be adversely effected; and the arene block domain phenomena is again not advantageously utilized.

SUMMARY OF THE INVENTION

According to the present invention, there is provided a supertoughened multiphase thermoplastic composition comprising a thermoplastic $\alpha$-polyamide and a modified alkenyl arene/conjugated diene block copolymer wherein an effective amount of carboxyl functional groups for super-toughening the multiphase thermoplastic composition are grafted to the block copolymer primarily in the alkenyl arene block. An $\alpha$-polyamide is a polyamide having only ene terminal group, typically an amine group, which is reactive with the carboxyl functional groups of the modified block copolymers utilized in the compositions herein. The modified block copolymer exists as discrete particle in the range of about 0.01 to about 2 $\mu$m, preferably about 0.05 to about 1.5 $\mu$m and more preferably about 0.1 to about 1.0 $\mu$m, and being adhered to the polyamide. It has been surprisingly found that the existence of the carboxylic acid and carboxylate ester and/or salt (neutralized) forms of the carboxyl functional groups either singly or in combination produces significant improvements in the impact properties of the overall blend. Although improvements may be obtained throughout the range of functionality levels and acid to salt or ester ratios of 100:0 to 0:100, super-tough blends may be attainable with modified block copolymers containing a specific level of carboxyl group functionality and neutralization (acid to salt ratio) or esterification within these ranges. The specific range of these ratios is dependent on the polyamide type and may be easily determined on a type by type basis.

More particularly, there is provided a super-toughened multiphase thermoplastic composition comprising:

a) one phase containing a thermoplastic α-polyamide; and b) at least one other phase containing at least one functionalized, selectively hydrogenated block copolymer to which has been grafted on the average an effective amount of carboxyl functional groups for super-toughening said multiphase thermoplastic composition, said functionalized block copolymer comprising 1) a base block copolymer which comprises i) at least two polymer blocks A, said A block being predominantly a polymerized alkenyl arene block, and ii) at least one selectively hydrogenated polymer block B, said B block prior to hydrogenation being predominantly a polymerized conjugated diene block, iii) wherein said at least one B block is between said at least two A blocks, 2) wherein substantially all of said carboxyl functional groups are grafted to said base block copolymer on said A blocks, c) said one phase (a) being present in a weight ratio of about 50:50 up to about 85:15 relative to said at least one other phase (b). These carboxyl functional groups may be in the form of carboxylic acids, their salts and esters.

The functionalized block copolymer is preferably characterized as having been prepared by the process which comprises metalating the base block copolymer, and reacting the resulting metalated base block copolymer with effective amounts of at least one graftable electrophilic molecule containing at least one of said carboxyl functional groups or with effective amounts of an electrophile, wherein the electrophile is carbon dioxide, thereby preparing the functionalized block copolymer.

Furthermore, the functionalized block copolymer may be linear or branched, with the term "branched" also including symmetric or asymmetric radial and star structures.

The effective amount of carboxyl functionality for super-toughening the composition is that amount which yields a composition which when injection molded has a ⅛ inch dry as molded notched izod toughness value (ASTM-256) in excess of about 10 ft-lb/in (54.35 Kg-cm/cm) and experiences ductile, as opposed to brittle, failure. This effective amount of carboxyl functionality is on the average preferably at least about ten (10) carboxyl functional groups per molecule of block copolymer, and more preferably at least about fifteen (15) and yet more preferably at least about thirty (30) carboxyl groups per molecule of block copolymer. It is presently believed that the addition of about one (1) carboxyl functional group per aromatic ring is limiting. Within the lower range of carboxyl group functionality, the degree of neutralization of carboxyl functional groups with metal ions (salt form) appears to have an effect on the degree of impact modification. In the compositions herein, it is presently believed that on the average at least about one (1) carboxyl functional group per molecule of copolymer be present in the carboxylic acid form—at least when the copolymer is functionalized to a level within the lower portion of the carboxyl group functionality levels specified above. As such, as the functionality level increases, super-tough compositions may be attained at correspondingly higher and higher neutralization levels until no perceivable effect of the degree of neutralization on super-toughening remains. At this point, the ability to detect any remaining carboxylic acid groups in a highly functionalized and neutralized copolymer eludes the detection sensitivity and accuracy of conventional techniques. However, the carboxylic acid groups' presence in the composition manifests itself in the attainment of super-tough compositions as determined by the above-referenced method. Additionally, the neutralized carboxyl groups may also react, though at a much slower rate than their carboxylic acid counterparts, with the reactive groups on the polyamide. Thus, as functionality levels increase and an effective quantity of neutralized carboxyl functional groups are present so as to maintain contact for an effective reactive duration with the polyamide reactive sites, it is also believed that a grafting reaction, or at least a chemical interaction of some strength, occurs between the neutralized carboxyl groups on the copolymer and the polyamide reactive groups. Thus, in short, an effective amount of carboxyl functional groups present in the modified block copolymers is that necessary to attain super-tough compositions, whether the carboxyl groups be in an all acid form (—COOH), an all ester or salt (e.g. —COOLi) form or a partial ester or salt form, as determined by the above-referenced notched izod toughness test method.

Preferably, there is provided the super-toughened multiphase thermoplastic composition as defined above, wherein (a) each of the A blocks prior to hydrogenation is predominantly a polymerized monalkenyl monocyclic arene block having an average molecular weight of about 1,000 to about 125,000, preferably about 1,000 to about 60,000, (b) each of the B blocks prior to hydrogenation is predominantly a polymerized conjugated diene block having an average molecular weight of about 10,000 to about 450,000, preferably about 10,000 to about 150,000, (c) the A blocks constitute between about 1 and about 99, preferably between about 2 and about 60, and more preferably between about 2 and 40, percent by weight of the copolymer, (d) the unsaturation of the B blocks is less than about 10 percent, preferably less than about 5 percent and more preferably at most about 2 percent, of the original unsaturation of the B blocks, (e) the unsaturation of the A blocks is greater than about 50 percent of the original unsaturation of the A blocks, (f) the carboxyl functional group is present on the average in amount from about ten (10) of said carboxyl functional groups per molecule of said copolymer to about one of said carboxyl functional groups per aromatic ring of said A blocks present prior to hydrogenation, preferably from about fifteen (15) of said carboxyl functional groups per molecule of said copolymer to about one of said carboxyl functional groups per aromatic ring of said A blocks and more preferably from about fifteen (15) of said carboxyl functional groups per molecule of said copolymer to about one of said carboxyl functional groups per every two aromatic rings of said A blocks with the proviso that said A blocks have a minimum total average molecular weight of at least about 3,000, and (g) on the average at least about one of said carboxyl functional groups per molecule of said copolymer be present in the carboxylic acid form and the remaining carboxyl functional groups in said copolymer may be esterified or ionized by neutralization with metal ions having a positive ionized valence state, preferably, from one to three inclusive.

A feature of this invention lies in providing polymeric compositions which are processable in solution and/or in the melt and have improved mechanical properties, such as impact resistance, etc.

Another feature of this invention lies in providing polymeric compositions which are considered super-tough.

Accordingly, those and other features and advantages of the present invention will become apparent from the following detailed description.

DETAILED DESCRIPTION OF THE INVENTION

Polyamides

By polyamide is meant a condensation product which contains recurring aromatic and/or aliphatic amide groups as integral parts of the main polymer chain, such products being known generically as "nylons." The polyamide matrix of the toughened compositions of this invention is well known in the art and embraces those semi-crystalline and amorphous resins having a molecular weight of at least 5000 having a linear or branched structure. Preferably, these polyamides are α-polyamides which have molecular weights of from about 5,000 to about 50,000. Furthermore, the polyamides are preferably linear with a melting point in excess of 200° C.

By "α-polyamides" is meant those polyamides having only one terminal group which is reactive with the carboxyl functional groups of the block copolymer utilized in the compositions herein, such as an amine group. Examples of such α-polyamides are those polyamides that may be obtained by polymerizing a monoaminocarboxylic acid or an internal lactam thereof having at least two carbon atoms between the amino and carboxylic acid groups thereof. Suitable polyamides include those described in U.S. Pat. Nos. 2,071,250; 2,071,251; 2,241,322; and 2,312,966.

As examples of the said monoaminocarboxylic acids or lactams thereof there may be mentioned those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, caprolactam, capryllactam, enantholactam, undecanolactam, dodecanolactam and 3- and 4-amino benzoic acids.

Illustrative examples of α-polyamides which may be incorporated in the thermoplastic polymer blends of the invention include:

polypyrrolidone (nylon 4)
polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12)

It is also possible to use in this invention polyamides prepared by the copolymerization of two or more of the above polymers or terpolymerization of the above polymers or their components.

Preferred nylons include 6; 11; and 12.

The amount of polyamide included in such compositions may vary widely depending upon the properties desired in the composition. For example, as great as 99 percent by weight of the composition may be composed of polyamide. However, the amounts of α-polyamide included in the "super-tough" compositions of the present invention range from about 50 to about 85 percent by weight based on total weight of the composition. Preferably, the amounts of polyamide are from about 50 to about 80 percent by weight with a more preferred amount being from about 50 to about 75 percent by weight and a particularly preferred amount being from about 50 to about 70 percent by weight, as these amounts appear to impart excellent impact resistance to the finished composition.

Selectively Hydrogenated Block Copolymer Base Polymer

The selectively hydrogenated block copolymers employed in the present invention may have a variety of geometrical structures, since the invention does not depend on any specific geometrical structure, but rather upon the chemical constitution of each of the polymer blocks, and subsequent modification of the block copolymer. The precursor of the block copolymers employed in the present composition are preferably thermoplastic elastomers and have at least two alkenyl arene polymer blocks A and at least one elastomeric conjugated diene polymer block B. Other than the foregoing limiation, the number of blocks in the block copolymer is not of special importance and the macromolecular configuration may be linear or branched, which includes graft, radial or star configurations, depending upon the method by which the block copolymer is formed.

Typical examples of the various structures of the precursor block copolymers used in the present invention are represented as follow:

(A-B)n+1
(A-B)n A
(B-A)n+1 B
[(A-B)p]m X
[(B-A)p+1]m X
[(A-B)pA]m X and

[(B-A)p B]m X wherein A is a polymer block of an alkenyl arene, B is a polymer block of a conjugated diene, X is a residual group of a polyfunctional coupling agent having two or more functional groups, n and p are, independently, integers of 1 to 20 and m is an integer of 2 to 20. Furthermore, the above-mentioned branched configurations may be either symmetrical or asymmetrical with respect to the blocks radiating from X.

It will be understood that both blocks A and B may be either homopolymer, random or tapered copolymer blocks as long as each block predominates in at least one class of the monomers characterizing the blocks defined hereinbefore. For example, blocks A may comprise styrene/alpha-methylstyrene copolymer blocks or styrene/butadiene random or tapered copolymer blocks as long as the blocks individually predominate in alkenyl arenes. The A blocks are preferably monoalkenyl arene. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene, and more preferred is butadiene.

Preferably, the block copolymers of conjugated dienes and alkenyl arene hydrocarbons which may be utilized include any of those which exhibit elastomeric properties; and those butadiene derived block copolymers which have 1,2-microstructure contents prior to hydrogenation of from about 7 to about 100 percent, preferably from about 25 to about 65 percent, more preferably from about 35 to about 55 percent. Such block copolymers may contain various ratios of conjugated dienes to alkenyl arenes. The proportion of the alkenyl arene blocks is between about 1 and about 99 percent by weight of the multiblock copolymer, preferably between about 2 and about 60 percent, more preferably between about 2 and about 55 percent by weight and particularly preferable between about 2 and about 40 percent by weight. When the alkenyl arene content is not more than about 60 percent by weight, preferably not more than about 55 percent by weight, the precursor block copolymer has characteristics as a thermoplastic elastomer; and when the alkenyl arene content is greater than about 60 percent by weight, preferably more than about 70 percent by weight, the precursor block copolymer has characteristics as a resinous polymer.

The average molecular weights of the individual blocks may vary within certain limits. In most instances, the monoalkenyl arene blocks will have average molecular weights in the order of about 1,000 to about 125,000, preferably about 1,000 (about 1,500 if the block copolymer contains only two A blocks) to about 60,000, while the conjugated diene blocks either before or after hydrogenation will have average molecular weights in the order of about 10,000 to about 450,000, preferably about 10,000 to about 150,000. The total average molecular weight of the multiblock copolymer is typically in the order of about 12,000 to about 700,000, preferably from about 13,000 to about 270,000. These molecular weights are most accurately determined by gel permeation chromatography.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627, the disclosures of which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, the disclosures of which are incorporated herein by reference.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These polymers and copolymers are preferably hydrogenated to increase their thermal stability and resistance to oxidation. The hydrogenation of these polymers and copolymers may be carried out by a variety of well established processes including hydrogenation in the presence of such catalysts as Raney Nickel, noble metals such as platinum, palladium and the like, and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual ethylenic unsaturation content in the polydiene block of not more than about 20 percent, preferably not more than about 10 percent, more preferably not more than about 5 percent and most preferably not more than about 2 percent, of their original ethylenic unsaturation content prior to hydrogenation.

Modified Block Copolymers

The modified block copolymers according to the present invention are preferably grafted or substituted in the alkenyl arene block by the metalation process as later described herein. Exemplary reactions are given below utilizing an exemplary styrene unit from a polystyrene segment of a suitable block copolymer:

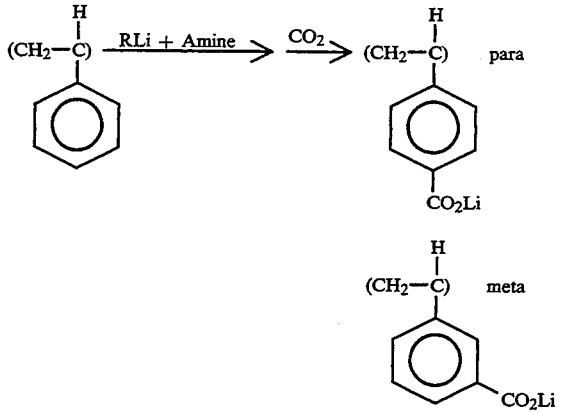

Where: RLi = Alkyl Lithium

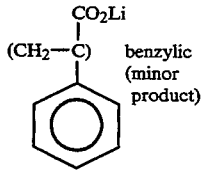

The structure of the substituted block copolymer specifically determined by locating the functionality on the alkenyl arene block gives the block copolymer a substantially greater degree of thermal stability.

Graftable Compounds

In general, any materials having the ability to react with the metalated base polymer are operable for the purposes of this invention.

In order to incorporate functional groups into the metalated base polymer, electrophiles capable of reacting with the metalated base polymer are necessary. Reactants may be polymerizable or nonpolymerizable; however, preferred electrophiles are nonpolymerizable when reacted with metalated polymers such as those utilized herein.

The class of preferred electrophiles which will form graft polymers within the scope of the present invention include reactants from the following groups carbon dioxide, ethylene oxide, aldehydes, ketones, carboxylic acid derivatives such as their salts, esters and halides, epoxides, sulfur, boron alkoxides, isocyanates and various silicon compounds.

These electrophiles may contain appended functional groups as in the case of N,N-dimethyl-p-aminobenzaldehyde where the amine is an appended functional group and the aldehyde is the reactive electrophile. Alternatively, the electrophile may react to become the functional site itself; as an example, carbon dioxide (electrophile) reacts with the metalated polymer to form a carboxyl functional group. By these routes, polymers could be prepared containing grafted sites selected from one or more of the following groups of functionality type carboxylic acids, their salts and esters, ketones, alcohols and alkoxides, amines, amides, thiols, borates, anhydrides, and functional groups containing a silicon atom.

These functionalities can be subsequently reacted with other modifying materials to ultimately produce carboxyl functional groups appended thereon which are necessary for the impact modification effect observed and relied upon herein. In some cases, the reaction could take place simultaneously with the grafting process but in most examples it would be practiced in subsequent post modification reaction.

The effective amount of carboxyl functionality for super-toughening the composition (polyamide blend) is that amount which yields a composition which when injection molded has a $\frac{1}{8}$ inch dry as molded notched izod toughness value (ASTM-256) in excess of about 10 ft-lb/in (54.35 Kg-cm/cm) and experiences ductile, as opposed to brittle, failure. This effective amount of carboxyl functionality is on the average in an amount from about ten (10) carboxyl functional groups per molecule of the copolymer to about one (1) carboxyl functional group per aromatic ring of the A blocks. Preferably, the range is on the average in an amount from about fifteen (15) carboxyl functional groups per molecule of copolymer to about one (1) carboxyl functional groups per aromatic ring of the A blocks and more preferably from about fifteen (15) carboxyl functional groups per molecule of copolymer to about one (1) carboxyl functional group per every two (2) aromatic rings of the A blocks. It is currently believed that the addition of about one electrophile per aromatic ring is limiting. Thus, if carbon dioxide is used as the electrophile, this translates to about one carboxyl group per aromatic ring.

As previously noted, these carboxyl functional groups may be esterified or ionized by neutralization with metal ions having a positive ionized valence state. The metal ions may be selected from the group consisting of uncomplexed and complexed metal ions. Preferably, the metal ions have a positive ionized valence state of from one to three inclusive. Within the lower range of carboxyl group functionality, the degree of neutralization appears to have an effect on the degree of impact modification. In the blend compositions herein, it is presently believed that on the average at least about one carboxyl functional group per molecule of copolymer be present as a carboxylic acid, preferably at least when the copolymer is functionalized to a level within the lower portion of the carboxyl group functionality levels specified above. As such, as the functionality level increases, super-tough polyamide blends may be attained at correspondingly higher and higher neutralization levels until no perceivable effect of the degree of neutralization remains. At this point, the ability to detect any remaining carboxylic acid groups in a highly functionalized and neutralized copolymer eludes the accuracy of conventional techniques. However, the carboxylic acid groups' presence in the blends manifests itself in the attainment of supertough polyamide blends. Additionally, the neutralized carboxyl groups may also react, though at much slower rate than their carboxylic acid counterparts, with the reactive groups on the polyamide. Thus, as functionality levels increase and an effective quantity of neutralized carboxyl groups are present so as to maintain contact for an effective reactive duration with the polyamide reactive sites, it is also believed that a grafting reaction, or at least a chemical interaction of some strength, occurs between the neutralized carboxyl groups on the copolymer and the polyamide reactive groups. Furthermore, the foregoing effects are also presently believed to be true with respect to the degree of esterification.

Thus, in short, an effective quantity of carboxyl functional groups present in the modified block copolymer is that necessary to attain super-tough polyamide/modified block copolymer blends, whether the carboxyl groups be in the all acid form, all carboxylate salt or ester form or somewhere in between. The super-tough characteristic of the blends of the present invention is readily verifiable by performing a ⅛" dry as molded notched izod toughness test (ASTM-256) on an average injection molded test specimen.

As previously noted, it is currently believed that the average of one addition per aromatic ring is limiting. However, it still remains that the greater the degree of functionality (carboxyl group content) attained, the greater the improvement in impact properties.

Neutralization of Modified Block Copolymer

The carboxylic acid groups in the modified block copolymers of the present invention may then be "neutralized" by reacting the polymer with an ionizable metal compound to obtain a metal salt. The improvement in impact properties resulting from the blend of the polyamide and the carboxylated block copolymer is greatly influenced by the type of polyamide, by the degree of carboxyl functionalization in the block copolymer, and by the degree of neutralization thereof.

The metal ions which are suitable in forming the neutralized block copolymers of the present invention are mono-, di- and trivalent ions of metals in Groups IA, IB, IIA, IIB, IIIA, IIIB, IV and VIII, of the Periodic Table of Elements. These metal ions can be used alone or in any mixture thereof. Suitable monovalent metal ions are $Na^+$, $K^+$, $Li^+$, $Cs^+$, $Ag^+$, $Hg^+$ and $Cu^+$. Suitable divalent metal ions are $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$, $La^{+3}$ and $Y^{+3}$. Preferable metal containing compounds for neutralization of the carboxylated block copolymers herein are hydroxides, oxides, alcoholates, carboxylates, formates, acetates, methoxides, ethoxides, nitrites, carbonates and bicarbonates of the above-referenced metal ions.

The degree of carboxyl functionality and of neutralization may be measured by several techniques. For example, infrared analysis may be employed to determine the overall degree of functionality calculated from the changes resulting in the absorption bands associated with -COOH units. Additionally, the titration of a solution of the block copolymer with a strong base may be utilized to determine the degree of functionality and/or degree of neutralization (metal carboxylate salt content.) Neutralization as used herein is based on the percentage of carboxylate ions ($—COO^-$) as compared to the total carboxyl group functionality, i.e., carboxylic acid plus the carboxylate ions.

In general, it was found that the added metal ion reacts approximately stoichiometrically with the carboxyl functional groups (acid form) in the polymer up to about 80 percent neutralization. Thereafter, excess quantities of the metal compound are necessary to carry the neutralization to completion.

Preparation of the Modified Block Copolymers

The polymers may be prepared by any convenient manner. Preferably, the polymer is prepared such that the functional groups are incorporated into the block copolymer primarily on the aromatic portion of the alkenyl arene block via metalation.

Metalation may be carried out by means of a complex formed by the combination of a lithium component which can be represented by $R'(Li)_x$ with a polar metalation promoter. The polar compound and the lithium component can be added separately or can be premixed or pre-reacted to form an adduct prior to addition to the solution of the hydrogenated copolymer. In the compounds represented by $R'(Li)_x$, the R' is usually a saturated hydrocarbon radical of any length whatsoever, but ordinarily containing up to 20 carbon atoms, and may also be a saturated cyclic hydrocarbon radical of e.g. 5 to 7 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product, metalated polymer alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly.

Generally, the lithium metalates the position allylic to the double bonds in an unsaturated polymer. In the metalation of polymers in which there are both olefinic and aromatic groups, the metalation will occur in the position in which metalation occurs most readily, as in positions (1) allylic to the double bond (2) at a carbon to which an aromatic is attached, (3) on an aromatic group, or (4) in more than one of these positions. In the metalation of saturated polymers having aromatic groups as is preferably the case herein, the metalation will occur primarily on an aromatic group and as a minor product at a carbon to which an aromatic is attached. In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(a) Chelating tertiary diamines, preferably those of the formula $R_2N—(CH_2)—_yNR_2$ in which each R can be the same or different straight- or branched-chain alkyl group of any chain length containing up to 20 carbon atoms, or more, all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexylenediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, triethylenediamine, and the like.

Tertiary monoamines such as triethylamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to about 20:1. Solvents such as chlorinated hydrocarbons, ketones, and alcohols, should not be used because they destroy the lithiating compound.

Polar metalation promotors may be present in an amount sufficient to enable metalation to occur, e.g. amounts between about 0.01 and about 100 or more preferably between about 0.1 to about 10 equivalents per equivalent of lithium alkyl.

The equivalents of lithium employed for the desired amount of lithiation generally range from such as about 0.001 to about 3.0 per alkenyl arene hydrocarbon unit in the copolymer, presently preferably about 0.01 to about 1.0 equivalents per alkenyl arene hydrocarbon unit in the copolymer to be modified. The molar ratio of active lithium to the polar promoter can vary from such as about 0.01 to about 10.0. A preferred ratio is about 0.5 to about 2.0.

The amount of lithium alkyl employed can be expressed in terms of the lithium alkyl to alkenyl arene hydrocarbon molar ratio. This ratio may range from a value of 1 (one lithium alkyl per alkenyl arene hydrocarbon unit) to as low as $1\times10^{-3}$ (1 lithium alkyl per 1000 alkenyl arene hydrocarbon units).

The process of lithiation can be carried out at temperatures in the range of such as about −70° C. to about +150° C., presently preferably in the range of about 25° C. to about 75° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally, the time can range from a few seconds to about 72 hours, presently preferably from about 1 minute to about 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species are selected from the class of molecules called electrophiles and must contain functional groups capable of undergoing nucleophilic attack by a lithium anion. As such, the modified block copolymer herein is the reaction product of an electrophile with an activated base (unmodified hydrogenated) block copolymer primarily at lithium anion sites on the aromatic substrates thereof, as opposed to the reaction product of an electrophile (strong Lewis acid) with an unactivated base block copolymer on the aromatic substrates thereof.

Such species will react to give polymer bound functional groups including but not limited to:

| | | | |
|---|---|---|---|
| $-\overset{O}{\overset{\|}{C}}-O^-$ | carboxyl | $-C-NR_2$ | Amine |
| $-C-OH$ | hydroxyl | $-\overset{O}{\overset{\|}{C}}-NR_2$ | Amide |
| $-C-OR$ | ether | $-SH$ | Thiol |
| $-\overset{O}{\overset{\|}{C}}-R$ | ketone | $-B(OR)_2$ | Borane Containing |
| $-\overset{O}{\overset{\|}{C}}-H$ | aldehyde | $-\overset{R_1}{\underset{R_3}{\overset{\|}{\underset{\|}{Si}}}}-R_2$ | Silicon Containing |

If necessary, the process also includes further chemistry on the modified block copolymer to carboxylate same. These grafted carboxyl functional groups may be present as carboxylic acids, their salts and esters, and combinations thereof. Additionally, carboxyl functional groups in any of these forms may be further reacted with other modifying materials to convert from one form to another, thereby varying the relative proportions of each of these carboxylate forms to the others. For example, grafted carboxylic acid groups could be suitably modified by esterifying same by appropriate reaction with hydroxy-containing compounds of varying carbon atom lengths. Whether the all acid or partially neutralized or esterified form is preferable to produce the greatest improvement in impact properties is dependent upon the polyamide chosen for the blend. A simple Notched Izod toughness test (ASTM-256) on a test specimen (bar) molded from such blends is clearly indicative and within the skills possessed by one of ordinary skill in the art.

The desired degree of neutralization may be achieved by various methods. If the modified block copolymer is in an all acid form or in a partially neutralized form and additional neutralization is desired, neutralization is preferably carried out under conditions which allow for a homogeneous uniform distribution of the metal containing compound in the modified block copolymer. No particular reaction conditions are essential except that the conditions should preferably permit the removal of the neutralization product. More specifically, the neutralization reaction is preferably carried either (1) by adding the metal containing compound, directly or in solution, to a solution of the modified block copolymer and then, on neutralization, precipitating and separating the resulting polymer; or (2) by melt blending the block copolymer with the metal containing compound. The melt blending is preferably conducted at elevated temperatures to facilitate homogeneous distribution of the metal containing compound and to volatilize the neutralization product.

Alternatively, if the modified block copolymer is in an all neutralized salt form or in a partially neutralized form and additional acidification (i.e., reverse-neutralization) is desired, acidification is likewise preferably carried out under conditions which allow for a homogeneous uniform distribution of the acid in the modified block copolymer. The acid utilized is preferably an organic acid, for example acetic acid or citric acid. The resulting metal-salt acidification product is not believed to be harmful to the resulting modified block copolymer or blend incorporating same. However, the metal salt may be removed by conventional means if so desired.

As an additional alternative, the all acid and the all neutralized salt forms of the block copolymer may be blended with each other or together with the desired polyamide or polyamides by either the solution or melt blending method mentioned above, to achieve the desired degree of neutralization. It is to be understood, however, that the specific technique employed is not critical as long as it meets the requirements set forth above. The extent of the neutralization i.e., the degree to which the metal ion is linked with the carboxylate ion may be readily analyzed by titration methods.

It is not essential that the metal containing compound be added as such, but it is possible to form the metal containing compound in situ from components which react with each other in the desired manner in the polymer environment. Thus, it is possible to add a metal oxide to the all acid or partially neutralized block copolymer then add an acid such as acetic acid in the proper proportion and form the metal containing compound, i.e., the metal acetate, while the polymer is milled. The metal containing compound then neutralizes the block copolymer to the desired degree depending on the proportion of metal containing compound formed.

Preparation of the Final Compositions

The toughened thermoplastic polymer compositions of the present invention can be readily prepared by using any conventional mixing apparatus which is normally used for mixing or blending of polymer substances. Examples of such apparatus are single or multiple screw extruders, mixing rollers, Brabender, Banbury mills, kneaders and the like. Alternatively, the blends may be made by coprecipitation from solution, blending or by dry mixing together of the components, followed by melt fabrication of the dry mixture by extrusion.

The polyamide blends of the present invention may be prepared by melt-blending the desired proportion of polyamide, ranging from about 50 percent to about 99 percent, with the desired proportion of the modified block copolymer, ranging from about 1 percent to about 50 percent. Taking economic and commercial considerations into account, the proportion of polyamide preferably ranges from about 70 percent to about 95 percent, or most preferably ranges from about 70 percent to about 90 percent, with the modified block copolymer making up the difference in the polyamide/-block copolymer blend. However, to produce a super-toughened $\alpha$-polyamide blend, the proportion of $\alpha$-polyamide ranges from about 50 to about 85 percent, more preferably from about 50 to about 80 percent, yet more preferably from about 50 to about 75 percent and particularly preferred from about 50 to about 70 percent, by weight, with the modified block copolymer making up the difference in the polyamide/block copolymer blend.

The impact properties of the blends of this invention are improved as characterized by a higher notched izod value over either the polyamide alone or in a blend with the base (unmodified hydrogenated) copolymer. The degree of impact properties desired may be controlled and varied by varying the degree of functionality (amount of functionality) and the degree of neutralization (quantity of ions) or esterification of the copolymer employed in the blend composition. Within this range of possible functionality, neutralization and esterification levels, blends considered to be "super-tough" may be attained. A blend is considered to be "super-tough" herein when its $\frac{1}{8}$" Notched Izod at room temperature (ASTM-256) is in excess of 10 ft-lb/in and the blend experiences a ductile failure, as opposed to a brittle failure.

Thus, the effective amount of carboxyl functionality for supertoughening the composition (polyamide blend) is that amount which yields a composition which when injection molded has a $\frac{1}{8}$ inch dry as molded notched izod toughness value (ASTM-256) in excess of about 10 ft-lb/in (54.35 Kg-cm/cm) and experiences ductile, as opposed to brittle, failure. This effective amount of carboxyl functionality is on the average in an amount from about ten (10) carboxyl functional groups per molecule of the copolymer to about one (1) carboxyl functional group per aromatic ring of the A blocks. Preferably, the range is on the average in an amount from about fifteen (15) carboxyl functional groups per molecule of copolymer to about one (1) carboxyl functional group per aromatic ring of the A blocks and more preferably from about fifteen (15) carboxyl functional groups per molecule of copolymer to about one (1) carboxyl functional group per every two (2) aromatic rings of the A blocks. It is currently believed that the average of one addition per aromatic ring is limiting.

As previously noted, these carboxyl functional groups may be ionized by neutralization with metal ions having a positive ionized valence state. The metal ions may be selected from the group consisting of uncomplexed and complexed metal ions. Preferably, the metal ions have a positive ionized valence state of from one to three inclusive, Within the lower range of carboxyl group functionality, the degree of neutralization appears to have an effect on the degree of impact modification.

In the blend compositions herein, it is presently believed that on the average there be at least about one carboxyl functional group per molecule of copolymer present as a carboxylic acid, preferably at least when the copolymer is functionalized to a level within the lower portion of the carboxyl group functionality levels specified above. For example, in a blend of an $\alpha$-polyamide (e.g. nylon 6) with a modified block copolymer containing on the average about 13.2 carboxyl groups per molecule of copolymer, super-tough impact properties were attained even at neutralization levels of up to about 95 percent which corresponds to about 0.66 (about one, within experimental error) carboxyl groups in the carboxylic acid form per molecule of copolymer. As such, as the functionality level increases, super-tough polyamide blends may be attained at correspondingly higher and higher neutralization levels until no perceivable effect of the degree of neutralization remains. At this point, the ability to detect any remaining carboxylic acid groups in a highly functionalized and neutralized or esterified copolymer eludes the accuracy of present techniques. However, the carboxylic acid groups' presence in the blends manifests itself in the attainment of super-tough polyamide blends, thereby indicating the effectiveness of the ASTM-256 test a technique in detecting same. Additionally, the neutralized carboxyl groups may also react, though at much slower rate than their carboxylic acid counterparts, with the reactive groups on the polyamide. Thus, as functionality levels increase and an effective quantity of neutralized carboxyl groups are present so as to maintain contact for an effective reactive duration with the polyamide reactive sites, it is also believed that a grafting reaction, or at least a chemical interaction of some strength, occurs between the neutralized carboxyl groups on the copolymer and the polyamide reactive groups.

Thus, in short, an effective quantity of carboxyl functional groups present in the modified block copolymer is that necessary to attain super-tough polyamide/modified block copolymer blends whether the carboxyl groups be in the all acid form, all carboxylate salt or ester form or somewhere in between. The super-tough characteristic of the blends of the present invention is readily verifiable by performing a ⅛" dry as molded notched izod toughness test (ASTM-256) on an injection molded test specimen.

The improvement in toughness of the compositions herein is related to the amount of adherent sites in the modified block copolymer component and the degree of block copolymer dispersion. The blends of the present invention are unlike the interpenetrating networks formed by the binary polyamide/unmodified block copolymer blends of Gergen et al. in U.S. Pat. Nos. 4,041,103 and 4,242,470. Gergen et al. utilized selective extraction to establish the presence or absence of the interlocking nature and continuity of each of the components therein. Similar selective extraction experiments were performed on molded or extruded test specimens made from blends of the present invention and from blends of unmodified block copolymers with polyamide. The unmodified block copolymer in the test specimens herein coexisted as an interpenetrating network with the polyamide as evidenced by the retention of shape by in the injection molded bars when placed in a polyamide solvent, such as formic acid. However, when the test specimens utilizing the blends of the present invention were placed in formic acid, the test specimens disintegrated (lost all shape and form) in a facile manner leaving particles of the modified block copolymer. The foregoing established that the modified block copolymer in the test specimens herein coexisted as a dispersed phase within the polyamide.

Moreover, observations lead to the speculation that a grafting reaction is possibly occurring between the modified block copolymer and the polyamide in the blends of the present invention. Such speculations are reinforced by the results obtained from an extension of the above-referenced selective extraction experiments. Once the test specimen had been placed in a solvent which quantitatively dissolves the polyamide (e.g. formic acid), a second solvent which quantitatively dissolves the block copolymer (e.g. toluene) was added thereto. The test specimens utilizing unmodified block copolymer/polyamide blends totally dissolved as evidenced by the facile disintegration of the injection molded bars in the two solvent solution. However, when test specimens utilizing blends of the present invention were placed in such a two solvent solution, a portion of the blend remained as an immiscible layer positioned between the two solvents, which is presumed to be the grafted material. (For ease of reporting herein, the immiscible layer has been incorporated in the polyamide/solvent fraction.)

The mechanism of adhesion and the role of the copolymer/polyamide interface to promote rubber (block copolymer) dispersion is not entirely understood. However, it appears that the grafting reactions and rubber dispersion process are interrelated. To some extent, enhancing the extent of reaction appears to facilitate rubber disperison. Moreover, it appears that by increasing the block copolymer/polyamide interface more sites are made available for the unknown mechanism herein to operate upon. Therefore, though the block copolymer may be continuous or partially continuous within the polyamide, the block copolymer is preferably dispersed therein.

Although moderate toughening is achieved with the existence of a finely dispersed adherent rubber, these requirements do not uniquely define a super-tough composition. The super-tough behavior apparently requires the existence of some level of grafting between the carboxyl groups, preferably in the carboxylic acid form, of the arene block within the modified block copolymer and an amine group of the polyamide. This level of carboxyl group functionality and grafting appears critical to dispersing the polymer and developing the appropriate stress distributions to induce matrix deformation and energy absorption. Hence, the super-tough blend compositions herein are unexpected and surprising.

The range of carboxyl group functionality which must be present in the physical network forming block copolymers herein, such as an A-B-A triblock copolymers, to induce super-toughening in nylon 6 is uniquely different and broader than the range claimed in the nylon 6,6 composition in copending U.S. patent application having attorney docket number T-4298. The modified block copolymers are more effective in toughening nylon 6 than nylon 6,6. The potential grafting reaction is facilitated between the polyamide and the carboxyl group functionality, preferably in the carboxylic acid form, in the modified block copolymer due to the enhanced probability of reaction observed in $\alpha$-polyamides.

As earlier noted, a characteristic feature of the $\alpha$-polyamides, such as nylon 6, is that these polyamides have only one terminal reactive amine group. However, $\alpha$,w-polyamides, such as nylon 6,6, have terminal reactive groups on each end. Thus, it is currently believed that if each of these two terminal reactive groups, particularly amine groups, react with a carboxyl group, particularly carboxylic acid groups, on a different modified block copolymer molecule, then the graft $\alpha$,w-polyamide molecules become tie molecules covalently, as opposed to physically, crosslinking the polyamide/-modified block copolymer system into a three-dimensional network. The formation of such a network at the interface between the polyamide and modified block copolymer phases has two interrelated deleterious effects. Firstly, in a static sense, such a network at this interface would effectively reduce or prevent further reaction between the two phases by reducing and eventually preventing diffusion of the reactive species to the interface. Secondly, in a dynamic sense, once this crosslinking has ensued, the flow or rheological characteristics of the two phases are severely restricted, thereby further reducing the ability of the two phases to further dispersed during blending and allow reactive species to diffuse to the interface. On the other hand, as the α-polyamides, such as nylon 6, are monofunctional in the sense that they have only one reactive terminal group, α-polyamides are unable to covalently crosslink the polyamide/modified block copolymer interface. Thus, the diffusion and rheological characteristics of such blends favor better dispersion and a higher probability of exposing additional reactive species at the interface. Hence, a lower concentration of carboxyl group functionality is required in the modified block copolymer composition with nylon 6 compared with nylon 6,6 to achieve optimum toughening characteristics.

Furthermore, there appears to be ionic crosslinking occurring within the alkenyl arene block domains of the modified block copolymer. The reaction mechanism involved in the formation of the ionic alkenyl arene block domains and the exact structure of these ionic clusters within the respective domain is also not completely understood at the present time.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

The compositions of the present invention can be readily molded or formed into various kinds of useful articles by using any conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, packaging materials, building materials and the like.

To assist those skilled in the art in the practice of this invention, the following Examples are set forth as illustrations. It is to be understood that in the specification and claims herein, unless otherwise indicated, when the amount of the polyamide or block copolymer is expressed in terms of percent by weight, it is meant percent by weight based on the total amount of these materials which is employed in the melt-blending. Furthermore, it is to be understood that, unless otherwise indicated, when the amount of carboxylic acid (—COOH) or carboxylate ion (—COO⁻) is expressed in terms of percent by weight (%w), it is meant percent by weight based on the molecular weight of the corresponding base block copolymer. In these Examples, injection molded bars of these compositions were tested using the following test procedures in the dry-as-molded state:

Notched Izod toughness: at each end ASTM D-256

Flexural Modulus: ASTM D-790

Properties represent an average of at least five test specimens.

EXAMPLES OF THE INVENTION

Having thus broadly described the present invention, it is believed that the same will become even more apparent by reference to the following examples. It will be appreciated, however, that the examples are presented solely for the purposes of illustration and should not be construed as limiting the invention.

The base (unmodified hydrogenated) block copolymers used were the polystyrene-poly(ethylene/-butylene)-polystyrene (S-EB-S) block copolymers shown in Table 1. The base block copolymers were the product of selectively hydrogenating a polystyrene-polybutadiene-polystyrene (S-B-S) block copolymer (precursor block copolymer) effected by use of a catalyst comprising the reaction products of an aluminum alkyl compound with nickel carboxylates. The base block copolymers have a residual ethylenic unsaturation of less than about 2% of the original unsaturation in the poly(conjugated diene) block and have a residual aromatic unsaturation of greater than 95% of the original unsaturation in the polystyrene block.

TABLE 1

| Base Block Copolymer | Styrene Content (wt. %) | Block Styrene Content (wt. %) | Total Mw. | Polymer Structure and Block Mw |
|---|---|---|---|---|
| A | 30 | 30 | 51,500 | 7,700-36,100-7,700 (S-EB-S) |
| B | 30 | 30 | 68,600 | 10,300-48,000-10,300 (S-EB-S) |

Remarks:
S-Polymer block composed chiefly of styrene.
EB-Polymer block composed chiefly of hydrogenated polybutadiene and referred to as ethylene/butylene.
Mw-Weight average molecular weight.

Per the following examples, the base block copolymer was first modified to varying degrees of carboxyl group functionality (content) by grafting carboxyl groups onto the polystyrene blocks via the metalation process described herein. The modified block copolymers were then further modified with lithium, sodium and zinc metals to form carboxylate salts at various acid to carboxylate salt contents (degree of neutralization).

EXAMPLE 1

Modified Block Copolymer

In this experiment, a modified block copolymer "C" was prepared utilizing the base block copolymer "A". A 5% (wt/wt) solution of Polymer A (see Table 1) in cyclohexane (3100 lb) was treated, in a closed vessel under nitrogen, with the metalation promoter, N,N,N',N'-tetramethylethylenediamine (TMEDA) (14 lb, 55 mol) and a titration indicator, 1,1-diphenylethylene (21 g, 0.1 mol). This solution was heated with stirring to 50° C and titrated with s-butyllithium solution to remove impurities. At the endpoint of the titration, a slight excess of s-butyllithium reagent was reacted with the indicator forming a benzylic anion which gave the solution a yellow/orange color; the persistence of this color was taken as an indication that the solution was now anhydrous and anaerobic. These conditions were maintained throughout the rest of the experiment.

The metalation reagent, s-butyllithium (41 lb of a 12% (wt/wt) solution in cyclohexane, 35 mol), was added to the reaction mixture over a period of. 15 minutes. The lithiated polymer cement was quite viscous and yellow in color. An aliquot of the cement was removed and treated with an excess of $D_2O$. This procedure placed a deuterium atom on the polymer at sites which had been lithiated. Analysis of the deuterated polymer using a Deuterium NMR technique found 89% of the deuterium was attached to the aromatic ring. Appropriate control experiments showed that the remainder of the deuterium label was at benzylic centers (about 5%) in the polystyrene segment and at allylic centers (about 6%) in the rubber of the polymer. These results showed that the polymer was lithiated principally in the styrene blocks (at least 94%).

After 1 hour in the lithiation reactor (60° C.), the cement was transferred to a closed vessel containing carbonated (142 lb of $CO_2$, 1500 mol) tetrahydrofuran (THF) (about 380 gal). The lithiated polymer cement was introduced below the surface of the $CO_2$/THF mixture. While carboxylation was likely instantaneous, the mixture was stirred at room temperature for 4 hr. The reactor product was acidified by the addition of 26 lbs. of acetic acid (200 mol). Modified block copolymer C was recovered by steam coagulation and dried at 50°-60° C. in a vacuum oven.

To measure the polymer bound carboxylic acid (—COOH) content of Polymer C, an aliquot of the finished polymer was dissolved in THF and titrated to a phenolphthalein endpoint using 0.01N KOH in methanol. The titration found 1.15% wt —COOH.

To determine the total carboxylate content, both —COO⁻ and —COOH moieties of Polymer C, an aliquot of the finished polymer was dissolved in cyclohexane at a 10% solids level and treated with an equal volume of acetic acid. Control experiments had shown that the acid treatment converted polymer bound —COO⁻ to —COOH species. The acidified mixture was repeatedly washed with $H_2O$ until the wash sample was neutral to remove excess acetic acid and acetate salts. The fully acidified polymer was precipitated in isopropanol, dried and titrated as outlined above. The titration found 1.15% wt —COOH; the same result as had been observed for the as finished polymer. By difference, we concluded that the as finished product, Polymer C, contained no carboxylate salt; Polymer C was in the all acid form —COOH.

An infrared analysis based upon characteristic IR bands for the —COOH species (1690 $cm^{-1}$) and polystyrene (1590 $cm^{-1}$) (in essence an internal standard signal) corroborated the titration results. The IR data were from a solution cast film of Polymer C.

Polymers D, R and S (see Table 2) were prepared using a modification of the procedure described for the preparation of Polymer C. Polymers D, R and S were prepared on a 5 lb scale. Polymer A was used as a starting material for polymer D and polymer B was used as a starting material for polymers R and S. These preparations respectively employed a decreased or an increased amount of the metalation reagent (promoter) relative to the amount of polymer substrate. This led to a product having lower or higher carboxylate content, respectively.

TABLE 2

| Modified Block Copolymer | Base Block Copolymer | Carboxyl Functionality (% w-COOH) | Ratio of Carboxyl Groups to Alkenyl Arene Units in Base Block Copolymer | Carboxyl Groups per Molecule of Block Copolymer |
|---|---|---|---|---|
| C | A | 1.15 | 1:12 | 13.2 |
| D | A | 0.86 | 7:100 | 9.8 |
| R | B | 0.80 | 1:17 | 12.2 |
| S | B | 0.43 | 1:31 | 6.6 |

EXAMPLE 2

Neutralized Modified Block Copolymers

In this example, modified block copolymers were neutralized utilizing monovalent metal counterions, such as sodium ($Na^{1+}$) and lithium ($Li^{1+}$), and divalent metal counterions, such as zinc ($Zn^{2+}$). The neutralized block copolymers were obtained by adding aqueous sodium hydroxide, lithium hydroxide and zinc acetate solutions in THF, respectively, to the modified block copolymer (all acid). The modified block copolymers neutralized utilizing magnesium metal counterions may be obtained by neutralizing the respective modified block copolymer (all acid) with magnesium methoxide in anhydrous methanol. For those neutralized modified block copolymers having a metal carboxylate salt content greater than 80% based on total carboxyl groups, an excess of the metal carrying compound was utilized (typically five times stoichiometric) to ensure the high degree of neutralization.

Table 3 indicates the various neutralized block copolymers produced from the corresponding modified block copolymers for purposes of the following examples.

TABLE 3

| Modified Block Copolymer | Carboxyl functionality (% w) | Metal Counterion | % Carboxyl Groups Neutralized | % w Acid | % w Salt |
|---|---|---|---|---|---|
| C | 1.15 | — | 0 | 1.15 | — |
| F1 | 1.15 | Li | 35 | 0.75 | 0.40 |
| F2 | 1.15 | Li | 55 | 0.52 | 0.63 |
| F3 | 1.15 | Li | 60 | 0.46 | 0.69 |
| F4 | 1.15 | Li | 95 | 0.06 | 1.09 |
| G1 | 1.15 | Na | 45 | 0.63 | 0.52 |
| G2 | 1.15 | Na | 55 | 0.52 | 0.63 |
| G3 | 1.15 | Na | 86 | 0.16 | 0.99 |
| H1 | 1.15 | Zn | >90 | — | — |
| D | 0.86 | — | 0 | 0.86 | — |
| J1 | 0.86 | Li | 50 | 0.43 | 0.43 |
| R | 0.80 | — | 0 | 0.80 | — |
| S | 0.43 | — | 0 | 0.43 | — |

EXAMPLE 3

Effect of Rubber Content on Blend Impact Properties

In this example, the impact strengths and flexural moduli of molded test pieces of various polyamide blend compositions were measured. The thermoplastic polyamide used in this example was a commercial nylon 6, Capron® 8200, a molding grade nylon obtained from Allied Chemical. Prior to all processing steps, the nylon 6 and its blends were dried at 60° C. for four (4) hours under vacuum with a nitrogen purge.

Blends of nylon 6 with both unmodified and modified block copolymer were prepared in a 30 mm diameter corotating twin screw extruder. The blend components were premixed by tumbling in polyethylene bags, and then fed into the extruder. The extruder melt temperature profile was about 220° C. in the feed zone, about 245° C. in the barrel, and about 215° C. at the die. A screw speed of 350 ppm was used. The extrudate was pelletized. Injection molded test specimens were made from pelletized extrudate using an Arburg injection molder (Model number 221-55-250). Injection temperatures and pressures of about 240° C. to about 270° C. and about 600 psig to about 1000 psig, respectively, were employed during the processing operations. The formulations and physical properties are shown in Table 4. Therein, samples "FF", "KK" and "GG" are controls.

As is readily apparent from Table 4, the addition of the modified block copolymer (C) significantly increases the impact strength of the polyamide (nylon 6). Additionally, improvements in the impact toughness of the modified block copolymer/nylon blends are surprisingly achieved without significantly sacrificing or compromising its flexural modulus (KK and GG versus LL and HH). Furthermore, the addition of at least about 20 percent by weight of the modified block copolymer produces a super-tough polyamide blend material. A material is defined to be "super-tough" when the room temperature impact strength determined using ASTM-256 exceeds 10 ft-lb/in and a ductile failure is observed. Herein, a distinct brittle to ductile failure transition is felt to occur between 10 and 20 percent by weight (more likely at about 15 percent by weight) of the modified block copolymer in the blend composition, whereas no such transition occurs in the blend containing the unmodified block copolymer.

TABLE 4

| Composition (% w) | Sample FF | KK | GG | LL | HH |
|---|---|---|---|---|---|
| Nylon 6 | 100 | 80 | 70 | 80 | 70 |
| Unmodified Block Copolymer (A) | — | 20 | 30 | — | — |
| Modified Block Copolymer (C) | — | — | 20 | 30 | |
| ⅛" Dry as Molded Notched Izod (ft-lb/in) | | | | | |
| Room Temperature | 1.1 | 2.5 | 2.2 | 22.1[a] | 26.1[a] |
| −20° F. | 0.7 | 1.2 | 1.2 | 2.6 | 3.4 |
| −40° F. | 0.7 | 1.3 | 1.2 | 2.2 | 2.2 |
| Flexural Modulus (Kpsi) | 355 | 270 | 245 | 285 | 235 |

[a]Ductile failure.

EXAMPLE 4

Effect of Different Polyamides on Blend Composition

In this example, the impact strengths and flexural moduli of molded test specimens of various polyamide blend compositions were measured. Herein, at a fixed polyamide to block copolymer ratio of 70:30, the measurements were performed on two different polyamide systems. The polyamides utilized were nylon 6,6 (Zytel® 101 from DuPont, an α,ω-polyamide) and nylon 6 (Capron® 8200 from Allied Chemical, an α-polyamide). Additionally, the degree of neutralization was varied to measure the corresponding effect on these properties. Specimens utilizing only the respective polyamide and a 70:30 ratio of polyamide to unmodified block copolymer were prepared as controls.

Blends of the respective polyamide with both unmodified and modified block copolymer were prepared in a Haakee 30 mm diameter corotating twin screw extruder. The blend components were premixed by tumbling in polyethylene bags and then fed into the extruder. The extruder melt temperature profile was about 220° C. in the feed zone, about 245° C. in the barrel and about 215° C. at the die. A screw speed of about 350 ppm was used. Injection molded test specimens were made from pelletized extrudate using an Arburg injection molder (Model number 221-55-250). Injection temperatures and pressures of about 240° C. to about 270° C. and about 600 psig to about 1000 psig, respectively, were employed during the processing operations.

As is readily apparent from Table 5, the effect of the degree of neutralization on the modified triblock copolymer on the impact properties of a polyamide blend is dependent on the particular polyamide and the level of —COOH present in the blend. Nylon 6, which is considered more reactive than nylon 6,6, apparently requires a lower level of —COOH present in blends containing nylon 6 versus nylon 6,6. Thus, at a fixed carboxyl functionality level in the modified polymer, nylon 6 blends maintain superior impact properties over a wider range of neutralization levels than nylon 6,6 blend. (Q versus JJ).

It is further apparent from Table 5 that super-tough blend compositions are attained when the proportion of modified triblock copolymer to α-polyamide is at least 30:70, and more likely at least 15:85. Additionally, the modified polymer therein contained 1.15% w carboxyl functionality which when neutralized to 95% still produced a super-tough blend composition (JJ).

Moreover, the mean particle size of the functionalized triblock copolymer in nylon 6 is less than the particles of the same functionalized triblock copolymer in nylon 6,6. These results suggest that the potential grafting reaction and block copolymer particle dispersion is facilitated between the α-polyamide and the modified (functionalized) block copolymer.

Thus, to reiterate, this example demonstrates the applicability of these modified block copolymers in developing super-tough α-polyamide compositions.

TABLE 5

| Sample[a] | Nylon | Block Copolymer | Metal Counterion | Acid to Salt[b] Ratio | Flexural Modulus (Kpsi) | ⅛" Dry as Molded Notched Izod Toughness (ft-lb/in) RT[c] | −20° F. | −40° F. | Particle size (μm) |
|---|---|---|---|---|---|---|---|---|---|
| L | 6,6 | — | — | — | 425 | 1.7 | 0.7 | 0.8 | — |
| N | 6,6 | A | — | — | 270 | 1.6 | 1.1 | 0.9 | 1.61 |
| P | 6,6 | C | — | 100:0 | 235 | 24.4[d] | 4.6 | 3.3 | 0.54 |
| Q | 6,6 | F4 | Li | 5:95 | 265 | 4.9 | 2.2 | 1.5 | 0.50 |
| FF | 6 | — | — | — | 355 | 1.1 | 0.7 | 0.7 | — |
| GG | 6 | A | — | — | 245 | 2.2 | 1.2 | 1.2 | 1.75 |

TABLE 5-continued

| Sample[a] | Nylon | Block Copolymer | Metal Counterion | Acid to Salt[b] Ratio | Flexural Modulus (Kpsi) | ⅛" Dry as Molded Notched Izod Toughness (ft-lb/in) RT[c] | −20° F. | −40° F. | Particle size (μm) |
|---|---|---|---|---|---|---|---|---|---|
| HH | 6 | C | — | 100:0 | 235 | 26.1[d] | 3.4 | 2.2 | 0.42 |
| JJ | 6 | F4 | Li | 5:95 | 235 | 25.3[d] | 3.6 | 2.7 | 0.48 |

[a]L, N, PF and GG are controls. Except for L and FF, all samples were formulated with 70% w polyamide and 30% w block copolymer.
[b]Ratio of carboxylic acid to metal carboxylate salt content.
[c]Room temperature.
[d]Ductile failure mechanism.

EXAMPLE 5

Effect of Degree of Functionality on Blend Properties

In this example, the impact strength of molded test specimens of various polyamide blend compositions were measured. Herein, at a fixed nylon 6 (Capron® 8200) to block copolymer ratio of 70:30, the degree of functionality (carboxyl group content) was varied to measure the corresponding effect on the impact strength of the respective compositions. The modified block copolymers utilized herein contained 1.15% w, 0.80% w and 0.43% w carboxyl functionality in the all acid form, polymers C, R and S respectively. Specimens utilizing nylon 6 (FF) and a 70:30 ratio of nylon 6 to unmodified block copolymer (GG and MM) were prepared as controls.

As is evident from Table 6, increasing the degree of carboxyl functionality in the modified block copolymer results in a dramatic improvement in the impact strength of the polyamide blend composition. A transition from a brittle to ductile failure mechanism is also observed. Thus, by incorporating more carboxyl group functionality in the alkenyl arene segment, the greater the probability of achieving grafting with the polyamide component which translates in part into improved impact properties. Furthermore, it appears that on the average at least about ten (10) carboxyl functional groups per molecule of copolymer may be necessary to attain super-tough polyamide blends herein. Therefore, the degree of functionality of the modified block copolymer provides another means by which impact modification of polyamides may be controlled.

TABLE 6

| Sample | Block Copolymer | Carboxyl Functionality (% w) | Carboxyl Groups per molecule of Block Copolymer | ⅛" Dry as Molded Notched Izod Impact Toughness (ft-lb/in) RT[b] | −20° F. | −40° F. | Flexural Modulus (Kpsi) |
|---|---|---|---|---|---|---|---|
| FF | — | — | — | 1.1 | 0.7 | 0.7 | 355 |
| MM | B | — | — | 2.1 | 1.5 | 1.4 | 215 |
| NN | R | 0.80 | 12.2 | 25.4[c] | 3.4 | 2.5 | 210 |
| OO | S | 0.43 | 6.6 | 3.0 | 1.4 | 1.3 | 225 |
| GG | A | — | — | 2.2 | 1.2 | 1.2 | 245 |
| HH | C | 1.15 | 13.2 | 26.1[c] | 3.4 | 2.2 | 235 |

[a]FF, GG and MM are controls. Except for FF, all samples were formulated with 70% w nylon 6 and 30% w block copolymer.
[b]Room temperature (23° C.).
[c]Ductile failure.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A super-toughened multiphase thermoplastic composition comprising:
   a) one phase containing a thermoplastic α-polyamide; and
   b) at least one other phase containing at least one functionalized, selectively hydrogenated block copolymer to which has been grafted on the average an effective amount of carboxyl functional groups for super-toughening said multiphase thermoplastic composition, said functionalized block copolymer comprising
      1) a base block copolymer which comprises
         i) at least two polymer blocks A, said A block being predominantly a polymerized alkenyl arene block, and
         ii) at least one selectively hydrogenated polymer block B, said B block prior to hydrogenation being predominantly a polymerized conjugated diene block,
         iii) wherein said at least one B block is between said at least two A blocks,
      2) wherein substantially all of said carboxyl functional groups are grafted to said base block copolymer on said A blocks,
   c) said one phase (a) being present in a weight ratio of about 50:50 up to about 85:15 relative to said at least one other phase (b),
   d) wherein the composition has a notched impact strength at room temperature of at least 22.1 ft-lb/in as measured by ASTM D-256.

2. The composition according to claim 1, wherein said carboxyl functional groups are carboxylic acids, their salts and esters.

3. The composition according to claim 1, wherein said effective amount of carboxyl functional groups is on the average at least about ten (10) of said carboxyl functional groups per molecule of said functionalized block copolymer.

4. The composition according to claim 3, wherein said effective amount of carboxyl functional groups is on the average in an amount from
about ten (10) of said carboxyl groups per molecule of said block copolymer to
about one (1) of said carboxyl groups per aromatic ring of said A blocks.

5. The composition according to claim 4, wherein said effective amount of carboxyl functional groups is on the average in an amount from
about fifteen (15) of said carboxyl groups per molecule of said block copolymer to
about one (1) of said carboxyl groups per aromatic ring of said A blocks.

6. The composition according to claim 5, wherein said effective amount of carboxyl functional groups is on the average in an amount from
about fifteen (15) of said carboxyl groups per molecule of said block copolymer to
about one (1) of said carboxyl groups per every two (2) aromatic rings of said A blocks.

7. The composition according to claim 1, wherein said one phase contains from about 50 to about 80 percent by weight of said thermoplastic α-polyamide.

8. The composition according to claim 1, wherein the α-polyamide is polycaprolactam (nylon 6).

9. The composition according to claim 1, wherein said at least one other phase containing said block copolymer is dispersed within said one phase containing said α-polyamide.

10. The composition according to claim 9, wherein said at least one other phase has a particle size from about 0.01 to about 2.0 μm.

11. The composition according to claim 10, wherein said at least one other phase has a particle size from about 0.05 to about 1.5 μm.

12. The composition according to claim 11, wherein said at least one other phase has a particle size from about 0.1 to about 1.0 μm.

13. The composition according to claim 1 wherein
(a) each of said A blocks prior to hydrogenation is predominantly a polymerized monoalkenyl monocyclic arene block having an average molecular weight of about 1,000 to about 125,000,
(b) each of said B blocks prior to hydrogenation is predominantly a polymerized conjugated diene block having an average molecular weight of about 10,000 to about 450,000,
(c) said A blocks constituting about 1 to about 99 percent by weight of said copolymer,
(d) the residual ethylenic unsaturation of said B block is less than about 10 percent of the ethylenic unsaturation of said B blocks prior to hydrogenation, and
(e) the residual aromatic unsaturation of said A blocks is greater than about 50 percent of the aromatic unsaturation of said A blocks prior to hydrogenation.

14. The composition according to claim 13, wherein prior to hydrogenation:
(a) said A block is polymerized styrene and
(b) said B block is selected from the group consisting of polymerized isoprene, polymerized butadiene, and polymerized isoprene and butadiene copolymer.

15. The composition according to claim 14, wherein said B block is a polymerized butadiene block having a 1,2 content of between about 35 percent and about 55 percent.

16. The composition according to claim 15, wherein said polymerized butadiene block has an average molecular weight of between about 10,000 to about 150,000.

17. The composition according to claim 16, wherein prior to functionalization said base block copolymer is a polystyrene-poly(ethylene/butylene)-polystyrene block copolymer.

18. The composition according to claim 14, wherein said B block is a polymerized isoprene block.

19. The composition according to claim 18, wherein said polymerized isoprene block has an average molecular weight of between about 10,000 to about 150,000.

20. The composition according to claim 19, wherein prior to functionalization said base block copolymer is a polystyrene-poly(ethylene/propylene)-polystyrene block copolymer.

* * * * *